US010436211B2

(12) United States Patent
McArdle et al.

(10) Patent No.: US 10,436,211 B2
(45) Date of Patent: Oct. 8, 2019

(54) COMPRESSOR WHEEL, METHOD OF MAKING THE SAME, AND TURBOCHARGER INCLUDING THE SAME (71) Applicant: BORGWARNER, INC., Auburn Hills, MI (US)

(72) Inventors: Nathan McArdle, Baildon (GB); Paul Murphy, Mirfield (GB); Tristram Palmer-White, Bradford (GB)

(73) Assignee: BorgWarner Inc., Auburn Hills, MI (US)

( * ) Notice: Subject to any disclaimer, the term of this patent is extended or adjusted under 35 U.S.C. 154(b) by 302 days.

(21) Appl. No.: 15/236,747

(22) Filed: Aug. 15, 2016

(65) Prior Publication Data
US 2018/0045214 A1 Feb. 15, 2018

(51) Int. Cl.
F04D 29/28 (2006.01)
F04D 29/42 (2006.01)
(Continued)

(52) U.S. Cl.
CPC ............ F04D 29/284 (2013.01); F01D 5/04 (2013.01); F01D 5/048 (2013.01); F01D 25/24 (2013.01);
(Continued)

(58) Field of Classification Search
CPC .... F04D 29/284; F04D 25/045; F04D 27/009; F04D 29/30; F04D 29/4206; F01D 5/04;
(Continued)

(56) References Cited

U.S. PATENT DOCUMENTS 3,504,986 A * 4/1970 Jackson .............. F04D 29/2277
415/58.5
4,248,566 A * 2/1981 Chapman ............ F04D 27/0215
415/914
(Continued)

FOREIGN PATENT DOCUMENTS

DE 10223876 A1 12/2003
DE 102014225674 A1 * 6/2016 ........... F04D 29/284
(Continued)

OTHER PUBLICATIONS 2D and 3D impellers of centrifugal compressors—advantages, shortcomings and fields of application, Y Galerkin et al. 2017 IOP Conf. Ser.: Mater. Sci. Eng. 232 012040, downloaded on May 25, 2018.*

(Continued)

Primary Examiner — Thai Ba Trieu
(74) Attorney, Agent, or Firm — Howard & Howard Attorneys PLLC (57) ABSTRACT A turbocharger includes a turbine housing defining a turbine housing interior, a turbine wheel disposed within the turbine housing interior, a shaft coupled to and rotatable by the turbine wheel, a compressor housing defining a compressor housing interior and a flow path, and a compressor wheel disposed within the compressor housing interior and coupled to the shaft. The compressor wheel has a hub coupled to the shaft, and a plurality of impeller blades extending radially from the hub. The plurality of impeller blades define an inducer end having an inducer diameter, and an exducer end having an exducer diameter greater than the inducer diameter. The inducer diameter and the exducer diameter establish a compressor trim. The compressor wheel also has a compressor wheel shroud disposed about the plurality of (Continued)

impeller blades. The compressor wheel shroud encloses the plurality of impeller blades to define a shroud interior.

16 Claims, 6 Drawing Sheets

(51) Int. Cl.
| | |
|---|---|
| *F01D 5/04* | (2006.01) |
| *F01D 25/24* | (2006.01) |
| *F02B 33/40* | (2006.01) |
| *F02B 37/00* | (2006.01) |
| *F02B 39/08* | (2006.01) |
| *F04D 25/04* | (2006.01) |
| *F04D 27/00* | (2006.01) |
| *F04D 29/30* | (2006.01) |
| *F02C 6/12* | (2006.01) |
| *F04D 29/68* | (2006.01) |

(52) U.S. Cl.
CPC .............. *F02B 33/40* (2013.01); *F02B 37/00* (2013.01); *F02B 39/08* (2013.01); *F02C 6/12* (2013.01); *F04D 25/045* (2013.01); *F04D 27/009* (2013.01); *F04D 29/30* (2013.01); *F04D 29/4206* (2013.01); *F04D 29/4213* (2013.01); *F04D 29/685* (2013.01); *F05D 2220/40* (2013.01); *F05D 2230/20* (2013.01); *F05D 2230/31* (2013.01); *F05D 2240/14* (2013.01); *Y02T 10/144* (2013.01)

(58) Field of Classification Search
CPC .......... F01D 25/24; F02B 33/40; F02B 39/08; F05D 2220/40; F05D 2230/20; B33Y 10/00; B33Y 50/02; B33Y 80/00; B22F 3/1055; G05B 2219/49018
USPC ............... 60/605.1; 415/159–164, 179, 57.1, 415/58.2–58.5, 914
See application file for complete search history.

(56) References Cited

U.S. PATENT DOCUMENTS

| | | | | |
|---|---|---|---|---|
| 5,246,335 A * | 9/1993 | Mitsubori | ............. | F04D 29/685 |
| | | | | 415/58.3 |
| 5,295,785 A * | 3/1994 | Church | ................ | F04D 29/685 |
| | | | | 415/58.4 |
| 5,779,440 A * | 7/1998 | Stricker | ............. | F04D 29/4213 |
| | | | | 415/914 |
| 6,623,239 B2 * | 9/2003 | Sahay | .................. | F04D 29/685 |
| | | | | 415/58.4 |
| 7,229,243 B2 * | 6/2007 | Nikpour | ............... | F04D 29/685 |
| | | | | 415/58.2 |
| 7,442,006 B2 * | 10/2008 | Nguyen | ............. | F04D 29/4206 |
| | | | | 29/889.22 |
| 7,775,759 B2 | 8/2010 | Sirakov et al. | | |
| 8,128,865 B2 | 3/2012 | Jahnz et al. | | |
| 8,287,233 B2 | 10/2012 | Chen | | |
| 8,375,816 B2 | 2/2013 | Braford, Jr. | | |
| 8,465,251 B2 * | 6/2013 | Hosoya | ................ | F04D 29/685 |
| | | | | 415/58.4 |
| 8,480,351 B2 * | 7/2013 | Wang | ................. | F04D 29/4206 |
| | | | | 415/143 |
| 8,899,931 B2 * | 12/2014 | Nakaniwa | ............ | F04D 29/284 |
| | | | | 416/185 |
| 8,998,581 B2 * | 4/2015 | Giovannetti | ........ | F04D 29/4206 |
| | | | | 29/889.23 |
| 9,091,275 B2 | 7/2015 | Chen | | |
| 9,234,525 B2 | 1/2016 | Voong et al. | | |
| 2005/0163606 A1 * | 7/2005 | Svihla | .................. | F04D 29/685 |
| | | | | 415/58.4 |
| 2007/0269308 A1 * | 11/2007 | Wood | .................... | F04D 29/685 |
| | | | | 415/57.1 |
| 2008/0267765 A1 * | 10/2008 | Chen | ..................... | F04D 29/685 |
| | | | | 415/58.4 |
| 2009/0252606 A1 | 10/2009 | Jahnen | | |
| 2013/0136587 A1 * | 5/2013 | Wang | .................. | F04D 29/4213 |
| | | | | 415/191 |
| 2013/0152582 A1 | 6/2013 | Anschel et al. | | |
| 2014/0294564 A1 | 10/2014 | Matwey et al. | | |
| 2014/0308132 A1 * | 10/2014 | Kim | ...................... | F04D 29/284 |
| | | | | 416/179 |
| 2015/0017001 A1 * | 1/2015 | Ahn | ...................... | F04D 29/284 |
| | | | | 416/179 |
| 2015/0037141 A1 | 2/2015 | Gerard et al. | | |
| 2015/0159664 A1 | 6/2015 | Olin et al. | | |
| 2015/0252810 A1 | 9/2015 | Decker | | |
| 2015/0292333 A1 | 10/2015 | Scheri et al. | | |
| 2015/0301519 A1 | 10/2015 | Cooper et al. | | |
| 2015/0377240 A1 | 12/2015 | Nasir | | |
| 2016/0146099 A1 | 5/2016 | Mohtar et al. | | |
| 2016/0201686 A1 | 7/2016 | Vogt et al. | | |
| 2016/0281538 A1 * | 9/2016 | Keltner | .................... | F01D 25/24 |
| 2017/0126087 A1 * | 5/2017 | Soderberg | ............ | H02K 21/042 |
| 2017/0138206 A1 * | 5/2017 | Smoke | .................... | F01D 5/048 |
| 2017/0276142 A1 * | 9/2017 | Graham | ................ | F04D 29/023 |
| 2017/0333979 A1 * | 11/2017 | Hannemann | .......... | F04D 29/284 |
| 2017/0350420 A1 * | 12/2017 | Lucas | .................... | F04D 29/284 |
| 2017/0370361 A1 * | 12/2017 | Arnold | .................. | F04D 29/284 |
| 2018/0094530 A1 * | 4/2018 | Smith | ........................ | F01D 5/04 |
| 2018/0283394 A1 * | 10/2018 | Miyoshi | .............. | F04D 29/4206 |
| 2018/0328379 A1 * | 11/2018 | Harris | ................. | F04D 29/4206 |

FOREIGN PATENT DOCUMENTS

| | | |
|---|---|---|
| JP | 2014118925 A | 6/2014 |
| WO | 2010128153 A1 | 11/2010 |
| WO | WO 2013/191937 A1 | 12/2013 |
| WO | 2015028169 A1 | 3/2015 |

OTHER PUBLICATIONS

The reference to Kim J. G. (Pub. No. KR 2017124029 A), published on Nov. 9, 2017.*

International Search Report for Application No. PCT/US2017/046717 dated Oct. 27, 2017, 6 pages.

English language abstract and machine-assisted English translation for DE 102 23 876 extracted from espacenet.com database on Nov. 16, 2017, 14 pages.

English language abstract and machine-assisted English translation for JP 2014-118925 extracted from espacenet.com database on Nov. 16, 2017, 18 pages.

English language abstract for WO 2015/028169 extracted from espacenet.com database on Nov. 16, 2017, 2 pages.

"3D-Printing—Impeller for Centrifugal Compressor", published Mar. 5, 2015, downloaded from www.thingverse.com/thing:710458 on May 9, 2016.

* cited by examiner

COMPRESSOR WHEEL, METHOD OF MAKING THE SAME, AND TURBOCHARGER INCLUDING THE SAME

BACKGROUND OF THE INVENTION

1. Field of the Invention

The invention generally relates to a compressor wheel for use in a turbocharger of a vehicle.

2. Description of the Related Art

Turbochargers receive exhaust gas from an internal combustion engine and deliver compressed air to the internal combustion engine. Turbochargers are used to increase power output of the internal combustion engine, lower fuel consumption of the internal combustion engine, and reduce emissions produced by the internal combustion engine. Delivery of compressed air to the internal combustion engine by the turbocharger allows the internal combustion engine to be smaller, yet able to develop the same or similar amount of horsepower as larger, naturally aspirated internal combustion engines. Having a smaller internal combustion engine for use in a vehicle reduces the mass and aerodynamic frontal area of the vehicle, which helps reduce fuel consumption of the internal combustion engine and improve fuel economy of the vehicle.

Typical turbochargers include a turbine housing defining a turbine housing interior, a turbine wheel disposed within the turbine housing interior, and a shaft coupled to and rotatable by the turbine wheel. Typical turbochargers also include a compressor housing defining a compressor housing interior and a flow path. The flow path fluidly couples the compressor housing interior with the internal combustion engine. Typical turbochargers further include a compressor wheel disposed within the compressor housing interior and coupled to the shaft. The compressor wheel is rotatable by the shaft for delivering compressed air to the internal combustion engine through the flow path. Specifically, energy from exhaust gas from the internal combustion engine, which would normally be wasted energy, is used to drive the turbine wheel, which is used to drive the shaft and, in turn, the compressor wheel to the deliver compressed air to the internal combustion engine.

Typical compressor wheels have a hub coupled to the shaft. Typical compressor wheels additionally have a plurality of impeller blades extending from the hub. The plurality of impeller blades define an inducer end having an inducer diameter, and an exducer end having an exducer diameter that is greater than the inducer diameter. The inducer diameter and the exducer diameter establish a compressor trim.

The compressor trim influences the amount of airflow through the compressor wheel. As such, depending on the desired performance of the internal combustion engine, typical compressor wheels are designed to deliver a target airflow to the internal combustion engine. In typical turbochargers, the airflow through the compressor wheel and to the internal combustion engine is also influenced by other factors. For example, depending on the design of the compressor housing, clearance between the impeller blades and the compressor housing may increase reverse airflow between the compressor wheel and the compressor housing, which ultimately reduces efficiency of the turbocharger and airflow to the internal combustion engine.

Typical compressor wheels are unable to adjust the compressor trim without also having to adjust the compressor housing to correspond to the compressor trim, which can add cost to designing and making the turbocharger as the compressor trim of each compressor wheel must be appropriately sized to fit within the compressor housing. Additionally, typical compressor wheels have a limited rotating speed due to radial growth of the impeller blades. Furthermore, typical compressor wheels are unable to reduce reverse airflow between the compressor wheel and the compressor housing. Also, typical compressor wheels have reduced capabilities at higher altitudes.

As such, there remains a need to provide for an improved compressor wheel for use in a turbocharger. Additionally, there remains a need provide a method of making the improved compressor wheel.

SUMMARY OF THE INVENTION AND ADVANTAGES

A turbocharger for receiving exhaust gas from an internal combustion engine and for delivering compressed air to the internal combustion engine includes a turbine housing defining a turbine housing interior. The turbocharger also includes a turbine wheel disposed within the turbine housing interior for receiving the exhaust gas from the internal combustion engine. The turbocharger further includes a shaft coupled to and rotatable by the turbine wheel. The turbocharger additionally includes a compressor housing defining a compressor housing interior and a flow path. The flow path fluidly couples the compressor housing interior with the internal combustion engine. The turbocharger further includes a compressor wheel disposed within the compressor housing interior and coupled to the shaft. The compressor wheel is rotatable by the shaft for delivering compressed air to the internal combustion engine through the flow path. The compressor wheel has a hub coupled to the shaft. The hub has a hub length extending along an axis that extends along the compressor housing interior. The hub presents an outer hub surface concentric about the axis. The hub has a first hub end and a second hub end spaced from the first hub end along the hub length. The turbocharger also has a plurality of impeller blades extending radially from the outer hub surface. Each of the impeller blades have a root portion coupled to the hub and a tip portion spaced radially about the axis from the root portion. The plurality of impeller blades define an inducer end having an inducer diameter (ID) adjacent the first hub end, and an exducer end having an exducer diameter (ED) adjacent the second hub end that is greater than the inducer diameter (ID). The inducer diameter (ID) and the exducer diameter (ED) establish a compressor trim (CT). The compressor wheel also has a compressor wheel shroud disposed about the plurality of impeller blades. The compressor wheel shroud encloses the plurality of impeller blades to define a shroud interior. One embodiment is directed toward a method of making a compressor wheel of a turbocharger.

Accordingly, the compressor wheel shroud of the compressor wheel allows the compressor trim to be adjusted without redesigning the compressor housing. Furthermore, the compressor wheel shroud allows the compressor wheel to be able to have a higher rotating speed. Additionally, the compressor wheel shroud of the compressor wheel limits reverse airflow that occurs between the impeller blades and the compressor housing in typical turbochargers. Also, the compressor wheel shroud allows the compressor wheel to have increased capabilities at higher altitudes.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
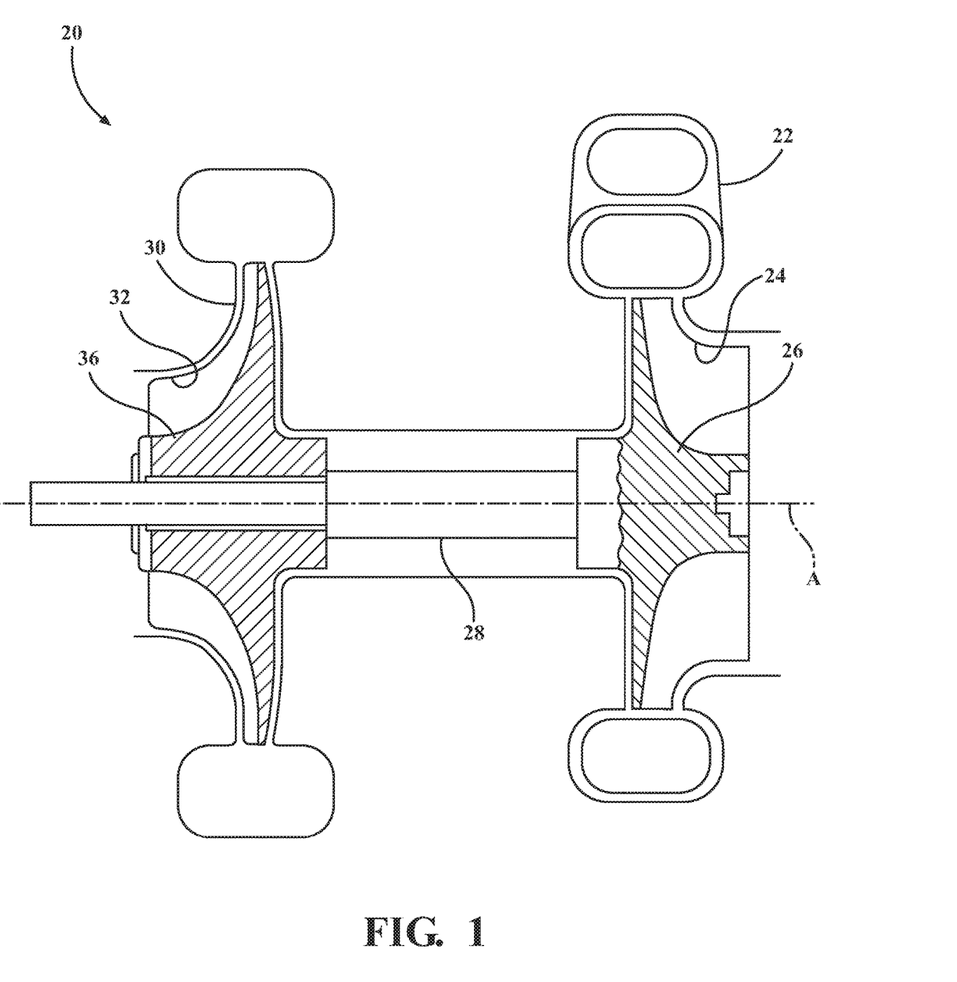
FIG. 1 is a schematically illustration of a turbocharger including a turbine housing defining a turbine housing interior, a turbine wheel disposed within the turbine housing interior, a shaft coupled to and rotatable by the turbine wheel, a compressor housing defining a compressor housing interior, and a compressor wheel disposed within the compressor housing interior and coupled to the shaft.

With reference to the Figures, wherein like numerals indicate like parts throughout the several views, a turbocharger 20 is generally shown in FIG. 1. The turbocharger 20 receives exhaust gas from an internal combustion engine and delivers compressed air to the internal combustion engine. The turbocharger 20 includes a turbine housing 22 defining a turbine housing interior 24. The turbine housing 22 receives and directs exhaust gas from the internal combustion engine. The turbocharger 20 includes a turbine wheel 26 within the turbine housing interior 24 for receiving the exhaust gas from the internal combustion engine. Specifically, the exhaust gas from the internal combustion engine is used to drive the turbine wheel 26. The turbocharger 20 includes a shaft 28 coupled to and rotatable by the turbine wheel 26. Specifically, the turbine wheel 26 is driven by the exhaust gas from the internal combustion engine, which, in turn, rotates the shaft 28.

The turbocharger 20 includes a compressor housing 30 defining a compressor housing interior 32 and a flow path 34. The compressor housing interior 32 receives and directs air to the internal combustion engine. The flow path 34 fluidly couples the compressor housing interior 32 with the internal combustion engine. The turbocharger 20 includes a compressor wheel 36 disposed within the compressor housing interior 32 and coupled to the shaft 28. The compressor wheel 36 is rotatable by the shaft 28 for delivering the compressed air to the internal combustion engine through the flow path 34.

Figure 3:
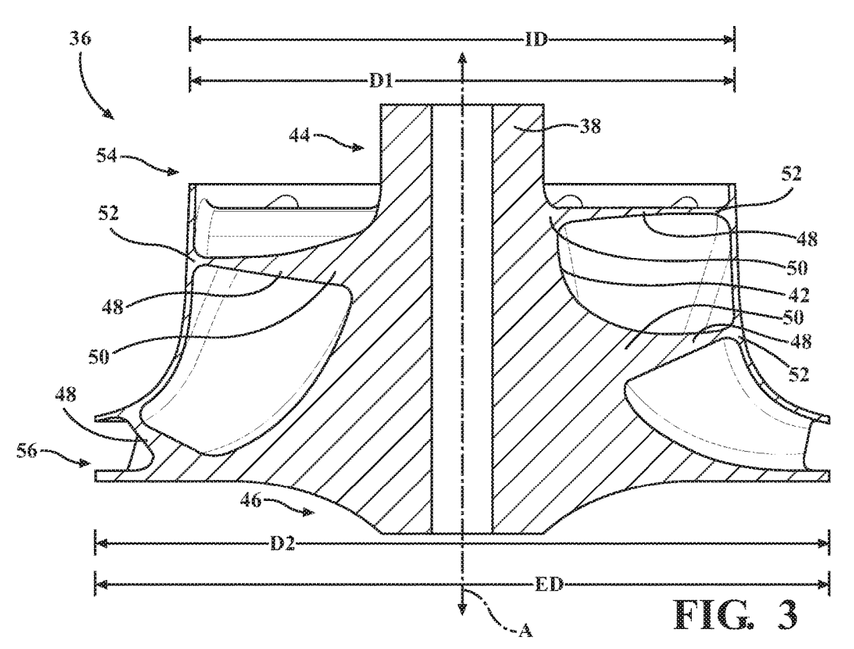
FIG. 3 is a cross-sectional view of the compressor wheel taken along line A-A of FIG. 2.
Figure 4:
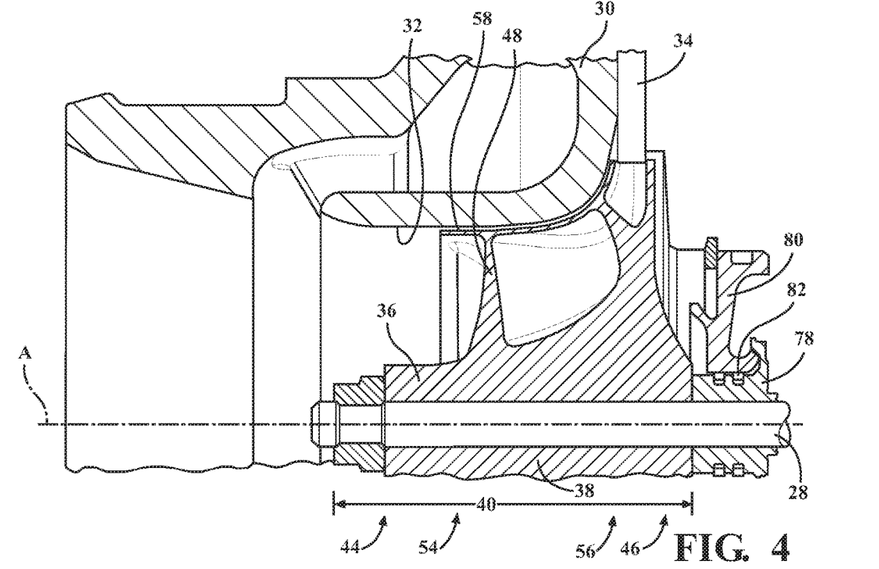
FIG. 4 is a cross-sectional view the compressor housing defining a compressor housing interior, with the compressor wheel disposed within the compressor housing interior.

The compressor wheel 36 has a hub 38 coupled to the shaft 28. The hub 38 has a hub length 40 extending along an axis A that extends along the compressor housing interior 32. The hub 38 presents an outer hub surface 42 concentric about the axis A. The hub 38 has a first hub end 44 and a second hub end 46 spaced from the first hub end 44 along the hub length 40. It is to be appreciated that the hub 38 may be a single component, as shown in FIG. 3, or the hub 38 may be two components, as shown in FIGS. 4-8.

The compressor wheel 36 has a plurality of impeller blades 48 extending radially from the outer hub surface 42, with each of the impeller blades 48 having a root portion 50 coupled to the hub 38 and a tip portion 52 spaced radially about the axis A from the root portion 50. As best shown in FIG. 3, the plurality of impeller blades 48 define an inducer end 54 having an inducer diameter (ID) adjacent the first hub end 44, and an exducer end 56 having an exducer diameter (ED) adjacent the second hub end 46 that is greater than the inducer diameter (ID). The inducer diameter (ID) and the exducer diameter (ED) establish a compressor trim (CT). Air enters into the compressor wheel 36 at the inducer end 54 and exits at the exducer end 56. The compressor trim (CT) is defined by the following formula:

$$CT = \left(\frac{ID^2}{ED^2}\right) * 100.$$

The compressor trim (CT) is a ratio of the areas of the inducer end 54 and the exducer end 56. As described in further detail below, the inducer diameter (ID) and exducer diameter (ED) may be adjusted to change the compressor trim (CT), therefore changing the airflow through the compressor wheel 36.

Figure 2:
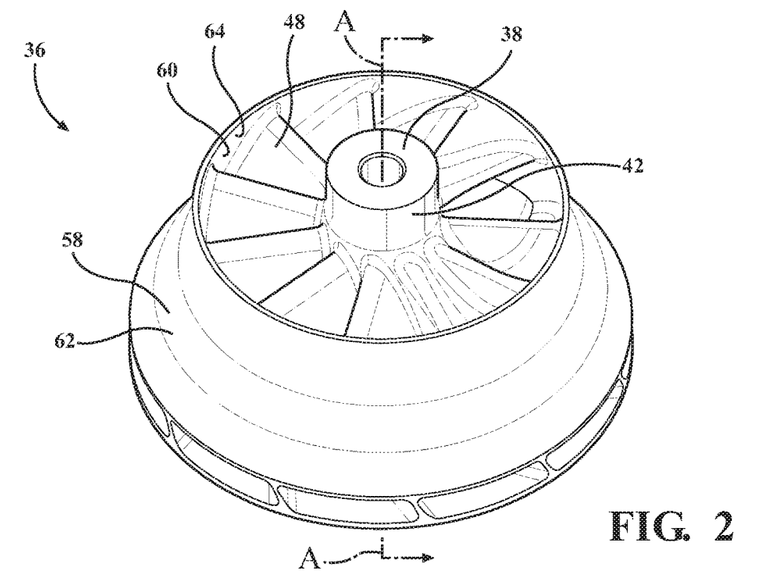
FIG. 2 is perspective view of the compressor wheel, with the compressor wheel having a hub, a plurality of impeller blades, and a compressor wheel shroud.

With reference to FIGS. 2 and 3, the compressor wheel 36 has a compressor wheel shroud 58 disposed about and configured to be rotatable with the plurality of impeller blades 48. The compressor wheel shroud 58 encloses the plurality of impeller blades 48 to define a shroud interior 60. In one embodiment, the compressor wheel shroud 58 is coupled to the tip portion 52 of the plurality of impeller blades 48. It is to be appreciated that the compressor wheel shroud 58 may be disposed about other portions of the plurality of impeller blades 48, such as between the tip portion 52 and the root portion 50 of the plurality of impeller blades 48, and still be configured to be rotatable with the plurality of impeller blades 48.

The compressor wheel shroud 58 has an outer shroud surface 62 facing the compressor housing 30, and an inner shroud surface 64 facing the shaft 28. The compressor wheel shroud 58 defines a first shroud diameter D1 adjacent the first hub end 44, and a second shroud diameter D2 adjacent the second hub end 46. Typically, the second shroud diameter D2 is greater than the first shroud diameter D1. When the compressor wheel shroud 58 is coupled to the tip portion 52 of the plurality of impeller blades 48, the first shroud diameter D1 may be equal to the inducer diameter (ID), and the second shroud diameter D2 may be equal to the exducer diameter (ED). When the second shroud diameter D2 is greater than the first shroud diameter D1, the compressor wheel shroud 58 may have a concave configuration with respect to the axis A.

The compressor wheel shroud 58 allows the compressor wheel 36 to have a higher rotating speed than typical compressor wheels due in part to the compressor wheel shroud 58 adding support to the plurality of impeller blades 48. Additionally, the compressor wheel shroud 58 helps reduce radial growth of the compressor wheel 36 and, specifically, the plurality of impeller blades 48 during high rotating speeds due in part to the compressor wheel shroud 58 adding support to the plurality of impeller blades 48. As one non-limiting example, the compressor wheel 36 may be rotatable up to 350,000 rotations per minute (RPM). In another instance, the compressor wheel 36 may be rotatable between 100,000 to 325,000 RPM. Typically, as the compressor wheel 36 decreases in size, the compressor wheel 36 is rotatable at higher RPMs, and as the compressor wheel 36 increases in size, the compressor wheel 36 is rotatable lower RPMs. As such, the compressor wheel shroud 58 supporting the plurality of impeller blades 48 allows the compressor wheel 36 to rotate at higher speeds which, in turn, helps deliver more compressed air to the internal combustion engine. Furthermore, the compressor wheel shroud 58 limits reverse air flow between the compressor wheel 36 and the compressor housing 30 due in part to the air flowing through the shroud interior 60, instead of having undesired reverse airflow between the impeller blades and the compressor housing as is the case in typical turbochargers. This allows the compressor wheel 36 to be more efficient as more compressed air gets delivered to the internal combustion engine due to limiting the reverse air flow. Also, the compressor wheel 36 has increased capabilities, such as better efficiency and higher airflow, at higher altitudes due in part to the compressor wheel shroud 58 directing more compressed air to the internal combustion engine and reducing reverse air flow.

The compressor wheel shroud 58 allows the compressor trim (CT) to be adjusted without having to adjust the design of the compressor housing 30. Depending on the target airflow through the compressor wheel 36 to the internal combustion engine, the compressor trim (CT) may be adjusted during manufacturing. For example, if a greater compressor trim (CT) is desired, additional material may be added to the inner shroud surface 64 at the exducer end 56 and/or material may be removed from the inner shroud surface 64 at the inducer end 54 during manufacturing. On the other hand, if smaller compressor trim (CT) is desired, additional material may be added to the inner shroud surface 64 at the inducer end 54 and/or material may be removed from the inner shroud surface 64 at the exducer end 56 during manufacturing. As described in further detail below, one method of manufacturing is 3-D printing the compressor wheel 36. It is to be appreciated that other methods of manufacturing may be used without departing from the nature of the present invention.

As described above, adding or removing material from the inner shroud surface 64 allows the compressor wheel 36 to be used with existing compressor housings while changing the compressor trim (CT) to meet different target airflows through the compressor wheel 36. In other words, depending on the desired compressor trim (CT) and the target airflow through the compressor wheel 36, only the dimensions of the compressor wheel 36 have to be adjusted, specifically the first shroud diameter D1 and/or the second shroud diameter D2 have to be, but the compressor housing 30 may remain the same. This eliminates costs associated with designing and making different compressor housings when a different compressor trim (CT) is desired. Similarly, material may also be eliminated and/or added at the outer shroud surface 62 at the exducer end 56 and/or the inducer end 54 to change the compressor trim (CT). Adding additional material at the outer shroud surface 62 can help add additional strength and support to the plurality of impeller blades 48 when material is removed from the inner shroud surface 64.

Figure 6:
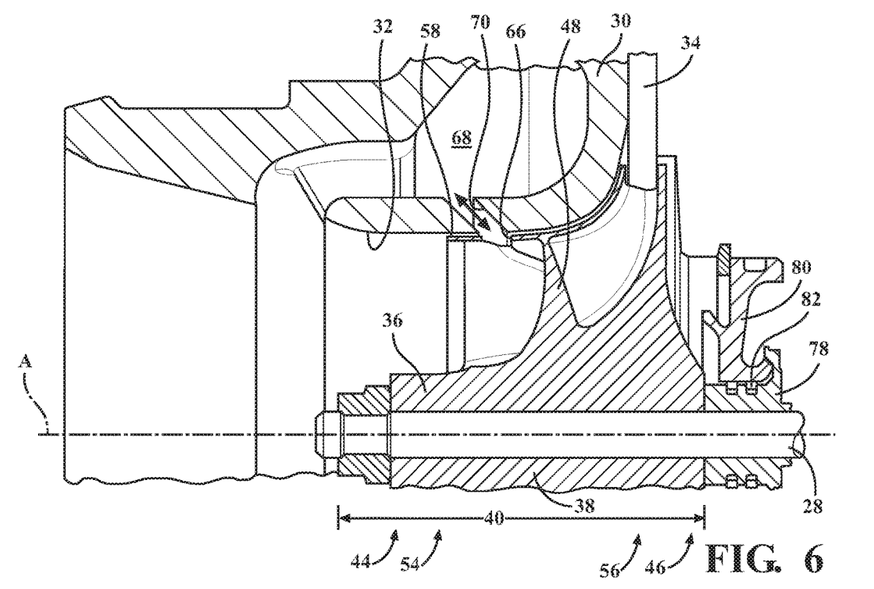
FIG. 6 is a cross-sectional view the compressor housing defining a compressor housing bleed slot, with the compressor wheel defining a shroud bleed slot and disposed within the interior of the compressor housing.

Although not required, the compressor wheel shroud 58 may define a shroud bleed slot 66 adjacent the first hub end 44 for allowing air to radially flow into and out of the shroud interior 60 with respect to the axis A, as described in further detail below. The shroud bleed slot 66 may be defined around the entire compressor wheel shroud 58 about the axis A, or the compressor wheel shroud 58 may define multiple shroud bleed slots 66 around the compressor wheel shroud 58 about the axis A.

The compressor housing 30 may define a recirculation cavity 68 about the axis A. When present, the recirculation cavity 68 helps recirculate air to the inducer end 54 of the compressor wheel 36, as described in further detail below.

The compressor housing 30 may define a compressor housing bleed slot 70 adjacent the shroud bleed slot 66 for allowing air to radially flow into and out of the shroud interior 60, radially flow into and out of the compressor housing interior 32 with respect to axis A, and radially flow into and out of the recirculation cavity 68 with respect to axis A. The compressor housing bleed slot 70 provides an escape path for air at the inducer end 54 of the plurality of impeller blades 48. Since the inducer diameter (ID) is typically less than the exducer diameter (ED), the tip speed of the plurality of impeller blades 48 at the inducer end 54 is less than the tip speed of the plurality of impeller blades 48 at the exducer end 56. As such, not all of the air entering into the shroud interior 60 at the inducer end 54 passes through the exducer end 56 and into the flow path 34. As a result, some of the air flows from the shroud interior 60, through the shroud bleed slot 66, through the compressor housing bleed slot 70, and into the recirculation cavity 68. Once the air is in the recirculation cavity 68, the air may then enter back into the inducer end 54 of the plurality of impeller blades 48. When present, the shroud bleed slot 66 and the compressor housing bleed slot 70 add stability to the air flow through the compressor wheel 36, help eliminate choppy air noise caused by air failing to flow through the compressor wheel 36, and help stabilize the compressor wheel 36 when the compressor wheel is near its surge point.

It is to be appreciated that the shroud bleed slot 66 may be defined at the second hub end 46 for allowing air to radially flow into and out of the shroud interior 60 with respect to the axis A. It is to be appreciated that when the shroud bleed slot 66 is defined at the second hub end 46, the compressor housing 30 may define the compressor housing bleed slot 70 adjacent the shroud bleed slot 66 for allowing air to radially flow into and out of the shroud interior 60 with respect to the axis A, into and out of the compressor housing interior 32 with respect to the axis A, and into and out of the recirculation cavity 68 with respect to the axis A. It is to be appreciated that the compressor housing 30 may define the compressor housing bleed slot 70 and the compressor wheel shroud 58 may be free of the shroud bleed slot 66.

Figure 7:
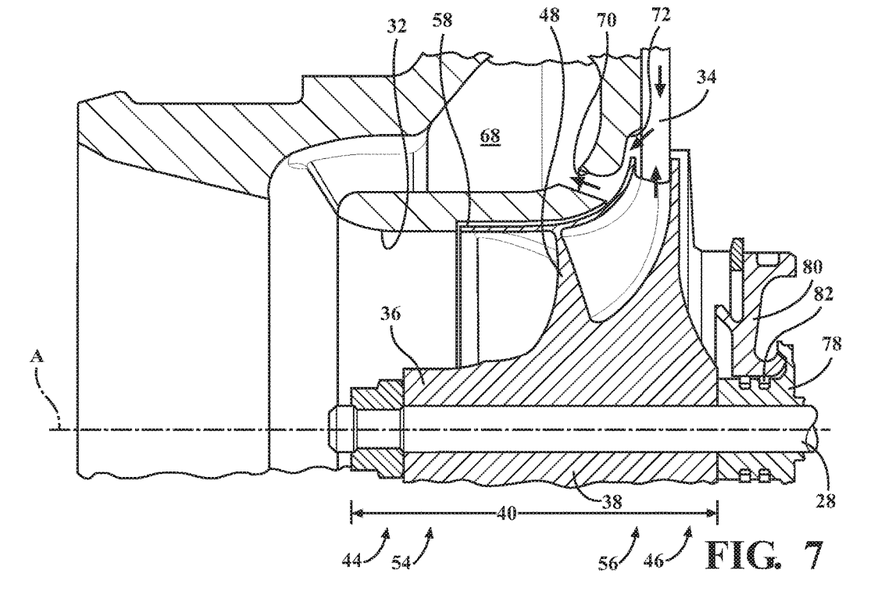
FIG. 7 is a cross-sectional view of the compressor housing defining a cutout, with the compressor wheel disposed within the interior of the compressor housing.

As shown in FIG. 7, the compressor housing 30 may define a cutout 72 adjacent the flow path 34. The cutout 72 fluidly couples the flow path 34, the compressor housing bleed slot 70, and the recirculation cavity 68 for allowing air to radially flow out of the compressor housing interior 32 and into the recirculation cavity 68 with respect to the axis A, as illustrated by arrows in FIG. 7. The cutout 72 allows reverse airflow from in the flow path 34 to flow from the flow path 34, through the cutout 72, through the compressor housing bleed slot 70, and into the recirculation cavity 68. The cutout 72 helps reduce reverse airflow from stalling the compressor wheel 36.

Figure 5:
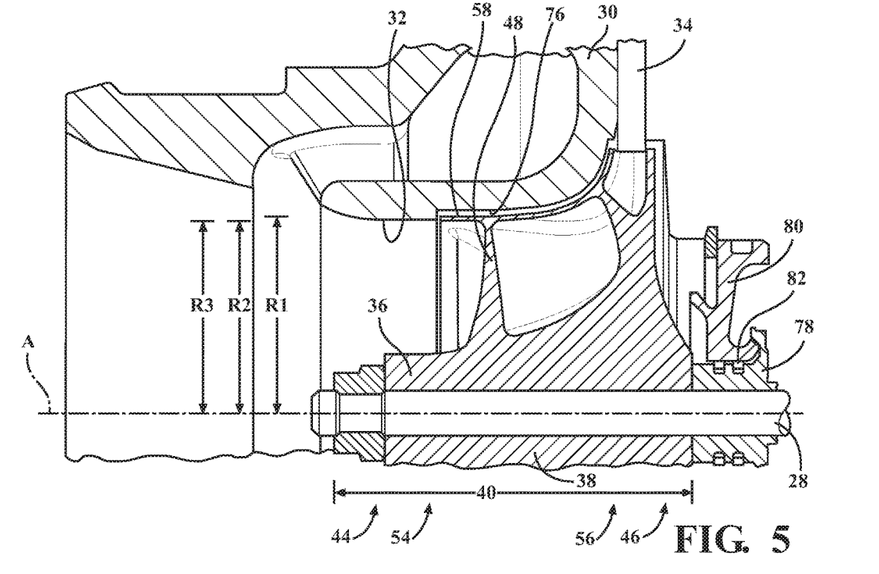
FIG. 5 is a cross-sectional view of the compressor housing defining a recess, with the compressor wheel disposed within the interior of the compressor housing.
Figure 8:
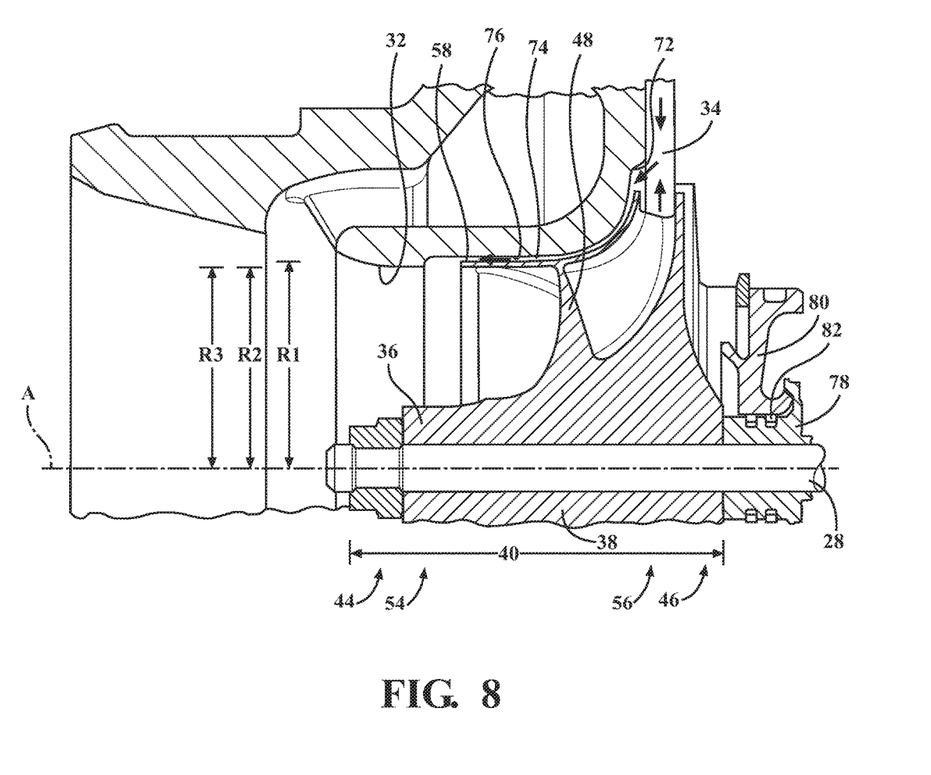
FIG. 8 is a cross-sectional view of the compressor housing, with the compressor wheel disposed within the interior of the compressor housing, and with the compressor housing and the compressor wheel defining a reverse flow path therebetween.

With reference to FIGS. 3, 5, and 8, the compressor wheel shroud 58 has an outer wheel shroud radius R1 along the hub length 40 and the compressor housing 30 has an inner compressor housing radius R2 along the hub length 40. As best shown in FIG. 8, the inner compressor housing radius R2 may be greater than the outer wheel shroud radius R1 for defining a reverse flow path 74 therebetween. The outer wheel shroud radius R1 and the inner compressor housing radius R2 increases moving along axis A from the inducer end 54 to the exducer end 56. The reverse flow path 74 allows air to flow back to the inducer end 54 of the compressor wheel 36 without interfering with other air flowing into the flow path 34 through the compressor wheel 36.

In one embodiment, the compressor housing 30 defines a recess 76 about the axis A. Typically, the recess 76 is defined in the compressor housing 30 when material is added to the outer shroud surface 62 for adjusting the compressor trim (CT). In this embodiment, the compressor wheel shroud 58 of the compressor wheel 36 may be at least partially disposed within the recess 76. In this embodiment, as best shown in FIG. 8, the recess 76 may act as the reverse flow path 74 for allowing air to flow back to the inducer end 54 of the compressor wheel 36 without interfering with other air flowing into the flow path 34 through the compressor wheel 36. In this embodiment, the recess 76 is used to allow reverse airflow, instead of using the cutout 72 and compressor housing bleed slot 70, as shown in FIG. 7.

As shown in FIG. 5, the compressor housing 30 has a first compressor housing radius R3 adjacent the first hub end 44 of the hub 38, with the first compressor housing radius R3 equal to one half of the inducer diameter (ID). The first compressor housing radius R3 being equal to the inducer diameter (ID) allows the inducer diameter (ID) to increase while using the same compressor housing 30, which increases airflow through the compressor wheel 36 and to the internal combustion engine.

The turbocharger 20 may also include a shaft bearing 78 disposed about the shaft 28 and abutting the compressor wheel 36. The shaft bearing 78 rotatable supports the shaft 28 during rotation of the shaft 28. The shaft bearing 78 is typically disposed next to a thrust bearing (not shown) such that the shaft bearing 78 is disposed between the thrust bearing and the compressor wheel 36. The turbocharger 20 may include a retaining ring 80 disposed about the shaft bearing 78 for preventing oil leakage from the thrust bearing. The turbocharger 20 may include a sealing element 82 disposed about the shaft bearing 78 and abutting the retaining ring 80 for preventing oil leakage from the thrust bearing.

Figure 9:
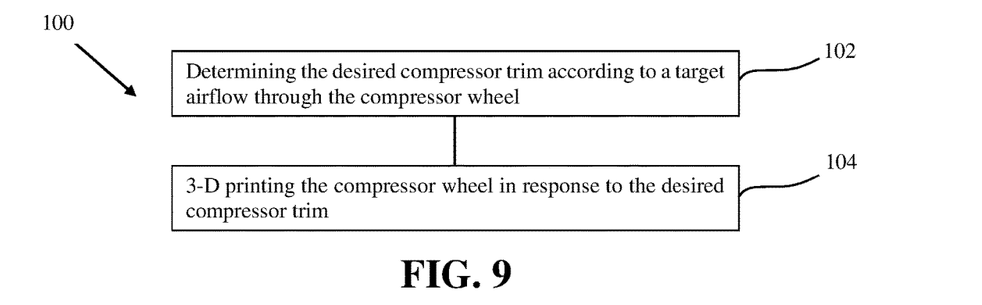
FIG. 9 is a flow chart of a method of making a compressor wheel of a turbocharger, with the method including the steps of determining the desired compressor trim according to a target airflow through the compressor wheel, and 3-D printing the compressor wheel in response to the desired compressor trim.

With reference to FIG. 9, a method 100 of making the compressor wheel 36 includes the step of determining the desired compressor trim (CT) according to a target airflow through the compressor wheel 36, as indicated by box 102. The method 100 also includes the step of 3-D printing the compressor wheel 36 in response to the desired compressor trim (CT), as indicated by box 104. 3-D printing the compressor wheel 36 is advantageous as it allows the compressor wheel 36 to be designed with the desired compressor trim (CT). As described above, the compressor trim (CT) may be adjusted to change the airflow through the compressor wheel 36. However, current methods of making compressor wheels, such as with standard milling machines and standard 5-axis milling, do not allow the milling machine to change the inducer diameter (ID) and the exducer diameter (ED) because the standard milling machine is unable to work between the plurality of impeller blades 48 to produce the desired compressor trim (CT). With 3-D printing, a desired compressor trim (CT) is able to be obtained, since 3-D printing machines are able to work around the plurality of impeller blades 48.

Figure 10:
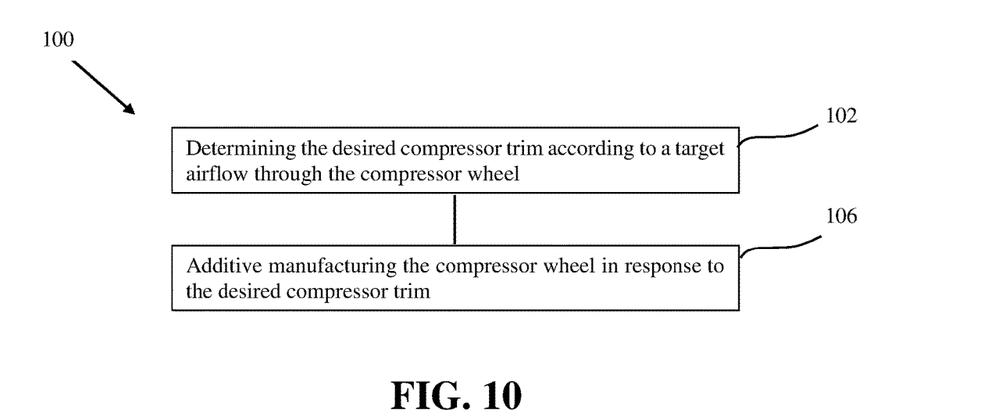
FIG. 10 is a flow chart of the method of FIG. 9, with the step of 3-D printing being further defined as additive manufacturing.

In one embodiment, as shown in FIG. 10, the step 104 of 3-D printing may further be defined as additive manufacturing, as shown in box 106. Additive manufacturing is advantageous, as layers of material are added outwardly onto the compressor wheel 36. As layers of material are added outwardly onto the compressor wheel 36, the plurality of impeller blades 48 are printed first, which then allows the compressor wheel shroud 58 to be added on after. This allows the desired inducer diameter (ID) and exducer diameter (ED) to be obtained, thereby establishing the desired compressor trim (CT). Furthermore, 3-D printing the compressor wheel 36 allows the inducer diameter (ID), the exducer diameter (ED), and the compressor trim (CT) to be adjusted to account for the desired airflow through the compressor wheel 36 and to account for the design of the compressor housing 30. As described above, material may be added to or removed from the inner shroud surface 64 to obtain the desired compressor trim (CT). Also, material may be added to or removed from the outer shroud surface 62 to add additional strength and support to the plurality of impeller blades 48 when material is removed from the inner shroud surface 64. When 3-D printing the compressor wheel 36, the compressor wheel shroud 58 may define the shroud bleed slot 66 at the first hub end 44. When 3-D printing the compressor wheel 36, the shroud bleed slot 66 may be defined around the entire compressor wheel shroud 58 about the axis A, or the compressor wheel shroud 58 may define multiple shroud bleed slots 66 around the compressor wheel shroud 58 about the axis A. In another embodiment, when 3-D printing the compressor wheel 36, the compressor wheel shroud 58 may define the shroud bleed slot 66 at the second hub end 46.

It is to be appreciated that various components of the turbocharger 20 and dimensions of the various components of the turbocharger 20 are merely illustrative and may not be drawn to scale. The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A compressor wheel for use in a turbocharger for a vehicle, said compressor wheel comprising:
   a hub having a hub length extending along a axis, with said hub presenting an outer hub surface concentric about said axis, and with said hub having a first hub end and a second hub end spaced from said first hub end along said hub length;

a plurality of impeller blades extending radially from said outer hub surface, with each of said impeller blades having a root portion coupled to said hub and a tip portion spaced radially about said axis from said root portion, with said plurality of impeller blades defining an inducer end having an inducer diameter (ID) adjacent said first hub end, and an exducer end having an exducer diameter (ED) adjacent said second hub end that is greater than said inducer diameter, and with said inducer diameter (ID) and said exducer diameter (ED) establishing a compressor trim; and a compressor wheel shroud disposed about and configured to be rotatable with said plurality of impeller blades, with said compressor wheel shroud enclosing said plurality of impeller blades to define a shroud interior;

wherein said compressor wheel shroud further defines multiple shroud bleed slots at said first hub end for allowing air to radially flow into and out of said shroud interior with respect to said axis.

2. The compressor wheel as set forth in claim 1, wherein said compressor wheel shroud is coupled to said tip portion of said plurality of impeller blades.

3. The compressor wheel as set forth in claim 1, wherein said compressor wheel shroud defines a first shroud diameter adjacent said first end of said hub, and a second shroud diameter adjacent said second end of said hub, with said second shroud diameter being greater than said first shroud diameter.

4. The compressor wheel as set forth in claim 3, wherein said compressor wheel shroud has a concave configuration with respect to said axis.

5. The compressor wheel as set forth in claim 1, wherein said compressor shroud is disposed between said tip portion and said root portion of said plurality of impeller blades.

6. A turbocharger for receiving exhaust gas from an internal combustion engine and for delivering compressed air to the internal combustion engine, said turbocharger comprising:

a turbine housing defining a turbine housing interior;

a turbine wheel disposed within said turbine housing interior for receiving the exhaust gas from the internal combustion engine;

a shaft coupled to and rotatable by said turbine wheel;

a compressor housing defining a compressor housing interior and a flow path, with said flow path fluidly coupling said compressor housing interior with the internal combustion engine; and a compressor wheel disposed within said compressor housing interior and coupled to said shaft, with said compressor wheel being rotatable by said shaft for delivering compressed air to the internal combustion engine through said flow path, said compressor wheel having, a hub coupled to said shaft, with said hub having a hub length extending along an axis that extends along said compressor housing interior, with said hub presenting an outer hub surface concentric about said axis, and with said hub having a first hub end and a second hub end spaced from said first hub end along said hub length, a plurality of impeller blades extending radially from said outer hub surface, with each of said impeller blades having a root portion coupled to said hub and a tip portion spaced radially about said axis from said root portion, with said plurality of impeller blades defining an inducer end having an inducer diameter (ID) adjacent said first hub end, and an exducer end having an exducer diameter (ED) adjacent said second hub end that is greater than said inducer diameter (ID), and with said inducer diameter (ID) and said exducer diameter (ED) establishing a compressor trim, and a compressor wheel shroud disposed about and configured to be rotatable with said plurality of impeller blades, with said compressor wheel shroud enclosing said plurality of impeller blades to define a shroud interior;

wherein said compressor housing defines a recirculation cavity about said axis and defines a compressor housing bleed slot for allowing air to radially flow into and out of said compressor housing interior with respect said axis, and flow radially into and out of said recirculation cavity with respect to said axis.

7. The turbocharger as set forth in claim 6, wherein said compressor wheel shroud is coupled to said tip portion of said plurality of impeller blades.

8. The turbocharger as set forth in claim 6, wherein said compressor wheel shroud defines a first shroud diameter adjacent said first end of said hub, and a second shroud diameter adjacent said second end of said hub, with said second shroud diameter being greater than said first shroud diameter.

9. The turbocharger as set forth in claim 6, wherein said compressor wheel shroud has a concave configuration with respect to said axis.

10. The turbocharger as set forth in claim 6, wherein said compressor wheel shroud defines a shroud bleed slot adjacent said first hub end for allowing air to radially flow into and out of said shroud interior with respect to said axis.

11. The turbocharger as set forth in claim 10, wherein said compressor housing bleed slot is adjacent said shroud bleed slot for allowing air to radially flow into and out of said shroud interior with respect said axis, radially flow into and out of said compressor housing interior with respect said axis, and flow radially into and out of said recirculation cavity with respect to said axis.

12. The turbocharger as set forth in claim 6, wherein said compressor housing defines a cutout adjacent said flow path, with said cutout fluidly coupling said flow path, said compressor housing bleed slot, and said recirculation cavity for allowing air to radially flow out of said compressor housing interior and into said recirculation cavity with respect to said axis.

13. The turbocharger as set forth in claim 6, wherein said compressor wheel shroud has an outer wheel shroud radius along said hub length and said compressor housing has an inner compressor housing radius along said hub length, with said inner compressor housing radius being greater than said outer wheel shroud radius for defining a reverse flow path therebetween.

14. The turbocharger as set forth in claim 6, wherein said compressor housing defines a recess about said axis, with said compressor wheel shroud of said compressor wheel at least partially disposed within said recess.

15. The turbocharger as set forth in claim 6, wherein said compressor housing has a first compressor housing radius adjacent said first hub end of said hub, with said first compressor housing radius equal to one half of said inducer diameter.

16. The turbocharger as set forth in claim 6, wherein said compressor shroud is disposed between said tip portion and said root portion of said plurality of impeller blades.

* * * * *